F. J. C. FREDERICK.
AUTOMATIC WINDER FOR SPRING MOTORS.
APPLICATION FILED APR. 14, 1914.
1,114,457.
Patented Oct. 20, 1914.
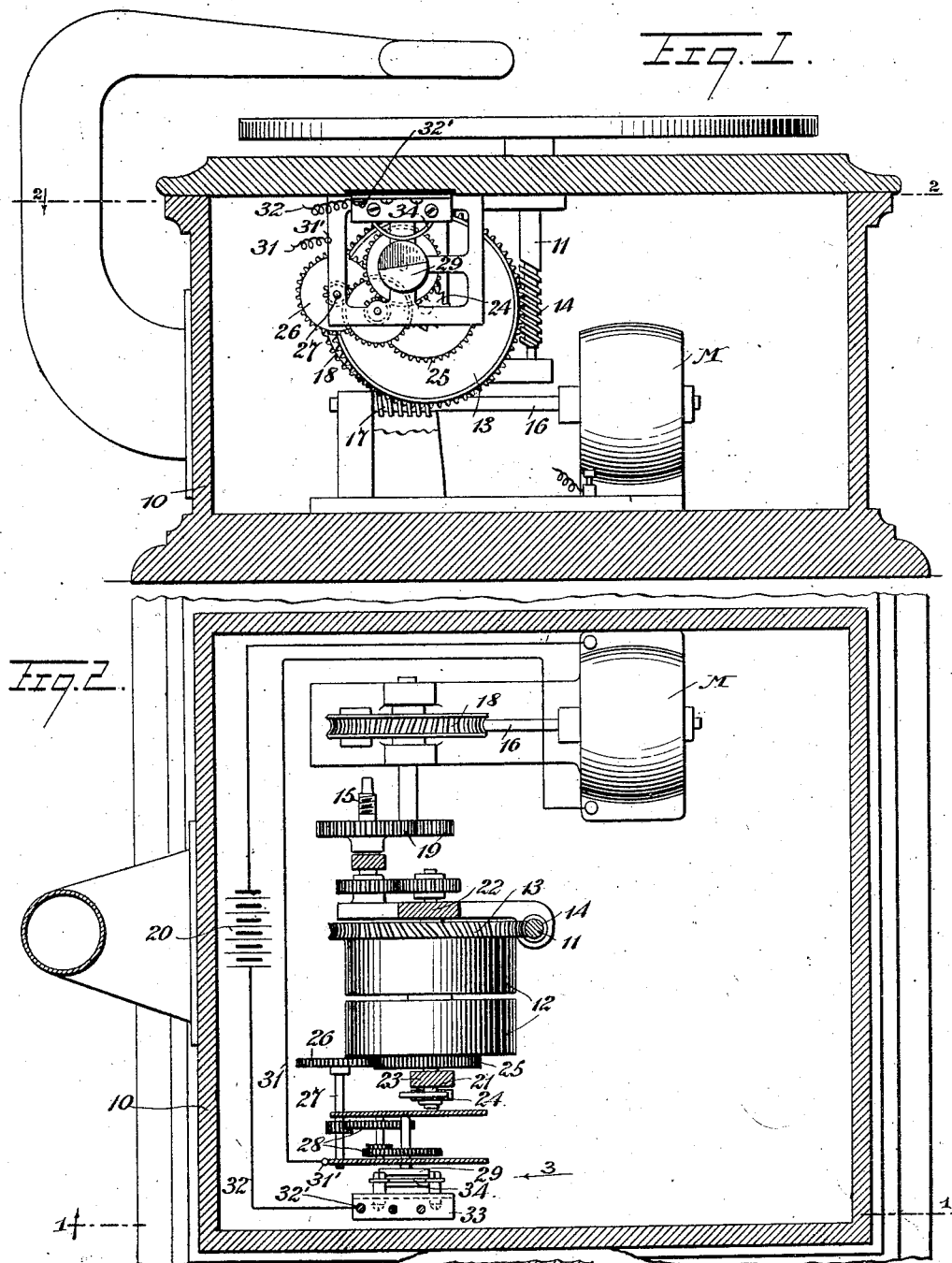

UNITED STATES PATENT OFFICE.

FRANCIS JENKINS CRADDOCK FREDERICK, OF JERSEY CITY, NEW JERSEY.

AUTOMATIC WINDER FOR SPRING-MOTORS.

1,114,457. Specification of Letters Patent. Patented Oct. 20, 1914.

Application filed April 14, 1914. Serial No. 831,775.

*To all whom it may concern:*

Be it known that I, FRANCIS J. C. FREDERICK, a citizen of the United States, and a resident of Jersey City, in the county of Hudson and State of New Jersey, have invented a new and Improved Automatic Winder for Spring-Motors, of which the following is a full, clear, and exact description.

This invention relates to spring motors, and has particular reference to means for automatically keeping the springs wound so as to relieve the operator from special attention and enable the machine to be actuated continually from the spring motor.

Among the objects of the invention, therefore, is to provide a self-winding device for a spring motor, such device to include an electric motor with a make and break device to start and stop the motor in accordance with the extent of the winding and unwinding movements of the spring or springs.

The foregoing and other objects of the invention will hereinafter be more fully described and claimed and illustrated in the drawings forming a part of this specification in which like characters of reference indicate corresponding parts in all the views, and in which—

Figure 1 is a vertical sectional view of a preferred embodiment of the invention on the line 1—1 of Fig. 2; Fig. 2 is a horizontal section on the line 2—2 of Fig. 1; and Fig. 3 is a detail view as seen in the direction of the arrow 3 of Fig. 2.

The several parts of the device may be made of any suitable materials, and the relative sizes and proportions, as well as the general design of the mechanism, may be varied to a considerable extent without departing from the spirit of the invention hereinafter more fully described and specifically claimed.

Referring more particularly to the drawings I show, by way of illustration, a talking machine casing 10 in which is journaled the vertical driven shaft 11 in any usual or preferred manner.

At 12 I show a pair of springs constituting a common form of driving means for the shaft 11 through a worm wheel 13 and worm 14.

Ordinarily a spring motor of the character set forth is wound by rotating the shaft 15 as by a hand crank. I provide, however, a rotary motor M for winding up the spring or springs, said motor including a shaft 16 having a worm 17 meshing with a worm wheel 18 having speed reduction gearing 19 connected with the aforesaid shaft 15. The motor may be located in any convenient place with respect to the casing 10 and is in circuit with a battery 20 of any suitable design or location. Any suitable means may be provided also to control the operation of the motor.

The central shaft 21 associated with the motor springs 12 is journaled in bearings 22 and 23, and at any convenient place is provided a pawl and ratchet mechanism 24 to control the rotation of said shaft 21. When the shaft 15 is rotated, to wind up the springs, the shaft 21 will likewise be rotated, the reverse movement of the shaft being prevented by the pawl and ratchet. While the springs are being wound up, a gear wheel 25 meshing with a gear 26 rotates a counter-shaft 27. By a suitable arrangement of reduction gearing 28, a peculiar form of circuit breaker including a semi-cylindrical member 29 is operated from the countershaft 27 coincidentally with the winding up of the springs. The reduction gearing just referred to is so constructed and timed with respect to the length of the springs as to provide for precisely a half rotation of the member 29 while the springs are being wound up. As will be noted from Figs. 1 and 3, the member 29 is secured to the last element 30 of the reduction gearing, the semi-cylindrical active portion thereof being concentric as to its curvature with said element 30 but lying entirely at one side of the axis thereof.

The wires 31 and 32 constituting the circuit including the motor and battery are connected to binding posts 31' and 32' respectively on opposite sides of the circuit breaker 29. The connection 31' may, if desired, constitute a ground for the wire 31 through the mechanism including the shaft 30 and circuit breaker 29. The binding post 32', however, is insulated at 33 from the mechanism and leads to an arc-shaped bridge 34 lying in the plane of the circuit breaker 29 and perpendicular to the axis 30. The arrangement of the bridge 34 is such as to just reach within the circumference, real or imaginary, of the semi-cylindrical element 29; that is to say, while the element 29 makes one complete rotation, the curved surface thereof contact with the bridge 34 during exactly one half of said rotation, and during the other half the circuit breaker is spaced from the bridge 34 as shown in Figs. 1 and 3. The arrangement of the mechanism is such that the shaft 21 always rotates in the same direction whether the spring is being wound up or is running down, and since the extent of movement of the spring is the same as it is in unwinding, such movement corresponds precisely to the two effects of the circuit breaker 29 with respect to the contact 34. In other words, the operation as to this feature of the invention may be briefly described as follows: When the curved surface of the member 29 engages the bridge 34, the circuit will be completed from the battery through the motor and the motor will operate to wind up the springs through the means above described and causing the element 29 to rotate around the axis of the shaft 30, this action of the mechanism, including the motor, continuing so long as any part of the curved surface of the element 29 engages the bridge 34. When, however, the element 29 passes the bridge 34, the circuit is broken and the motor is stopped. The springs 12, however, subject to the usual controlling means for the machine, are adapted to run down, and in so doing the element 29 continues in its rotation around the axis of the shaft 30 until the curved portion thereof again contacts the bridge 34, when the motor will again be started for rewinding the springs.

Since the fixed contact 34 lies or projects into the circumference or circular path of the semicylindrical rotary contact member 29, there results a positive direct wiping contact or engagement between them. There is no danger, therefore, of failure of the device to act because of corrosion of the contact surfaces or other reason. The structure also is of the simplest character with respect to manufacture and maintenance.

Having thus described my invention, I claim as new and desire to secure by Letters Patent:—

1. The combination with a spring motor and an electric motor automatically winding the same, of a make and break device for the motor circuit, said make and break device including a semi-cylindrical member adapted to be rotated from the springs and a stationary contact lying in a circle coinciding with the circumference of said semi-cylindrical member, said semi-cylindrical member being adapted to directly engage the fixed contact while the spring motor is being wound up and being spaced from the contact while the motor is running down.

2. The herein described automatic winding device for a spring motor, the same comprising a battery, an electric motor in circuit with the battery, constant driving connections between the electric motor and the spring motor, a make and break device including a semi-cylindrical rotary member having constant connection with the shaft of the spring motor and also including a fixed contact member associated with the battery circuit, said fixed contact and rotary make and break device member being in direct wiping engagement while the spring motor is being wound up by the electric motor and being spaced when the spring motor is running down.

In testimony whereof I have signed my name to this specification in the presence of two subscribing witnesses.

FRANCIS JENKINS CRADDOCK FREDERICK.

Witnesses:
J. E. HOWELL,
WM. FREDERICK.